US 6,729,469 B1

(12) United States Patent
Yau et al.

(10) Patent No.: US 6,729,469 B1
(45) Date of Patent: May 4, 2004

(54) STORAGE HOLDER FOR A COMPACT DISC

(75) Inventors: Barbara Suk Chun Yau, Shatin (HK);
Patrick Sung Fai Chan, Fanling (HK);
Fuk Po Wong, Tai Po (HK)

(73) Assignee: Technicolor Videocassette, Inc.,
Camarillo, CA (US)

( * ) Notice: Subject to any disclaimer, the term of this patent is extended or adjusted under 35 U.S.C. 154(b) by 0 days.

(21) Appl. No.: 10/281,642

(22) Filed: Oct. 28, 2002

(51) Int. Cl.[7] .............................................. B65D 85/57
(52) U.S. Cl. ..................... 206/308.1; 206/493; 206/310
(58) Field of Search .............................. 206/308.1, 309, 206/310, 311, 312, 493

(56) References Cited

U.S. PATENT DOCUMENTS

| | | |
|---|---|---|
| 3,896,929 A | 7/1975 | Mills |
| 4,293,266 A | 10/1981 | St. Lawrence et al. |
| 4,452,373 A | 6/1984 | Pearce et al. |
| 4,518,275 A | 5/1985 | Rauch, III et al. |
| 4,535,888 A | 8/1985 | Nusselder |
| 4,593,814 A | 6/1986 | Hagiwara et al. |
| 4,703,853 A | 11/1987 | Byrns |
| 4,793,479 A | 12/1988 | Otsuka et al. |
| 4,834,238 A | 5/1989 | Hehn et al. |
| 4,865,190 A | 9/1989 | Gregerson et al. |
| 4,871,065 A | 10/1989 | Hehn et al. |
| 4,874,085 A | 10/1989 | Grobecker et al. |
| 4,895,252 A | 1/1990 | Nomula et al. |
| 4,962,854 A | 10/1990 | Ricci |
| 4,974,740 A | 12/1990 | Niles et al. |
| 5,016,752 A | 5/1991 | Haugen, Jr. |

(List continued on next page.)

FOREIGN PATENT DOCUMENTS

| | | |
|---|---|---|
| DE | 34 25 579 A1 | 1/1986 |
| DE | 37 15 187 A1 | 11/1988 |
| DE | 41 07 218 A1 | 9/1992 |
| EP | 077 019 B1 | 9/1985 |
| EP | 356 539 A1 | 3/1990 |
| EP | 429 195 A2 | 5/1991 |
| GB | 2 127 203 A | 4/1984 |
| GB | 2 243 145 A | 10/1991 |
| JP | 02-205589 | 8/1990 |
| JP | 04-057778 | 2/1992 |
| JP | 05-051082 | 3/1993 |
| WO | WO 90/15001 | 12/1990 |
| WO | WO 93/01598 | 1/1993 |
| WO | WO 96/14636 | 5/1996 |
| WO | WO 01/61701 A1 | 8/2001 |

*Primary Examiner*—Shian Luong
(74) *Attorney, Agent, or Firm*—McDermott Will & Emery

(57) ABSTRACT

The disclosure relates to a storage holder (11) for a compact disc, and to a storage case (12) containing such a storage holder (11) wherein the storage holder (11) does not flex the compact disc during release and has a relatively simple design thereby avoiding the necessity of using complex molds. The storage holder comprises (a) a base portion;
(b) at least two inwardly extending radial arms connected so the base portion by a center disc supporting ring, each of said inwardly extending radial arms having a retaining rib for engaging the upper surface of the compact disc;
(c) a center button formed by the inner ends of the arms and which center button is receivable in the central hole of the compact disc;

and wherein release of the compact disc by depression of the center button and actuation of the retaining ribs and arms does not result in any flexing or lifting of the compact disc.

7 Claims, 6 Drawing Sheets

U.S. PATENT DOCUMENTS

| | | |
|---|---|---|
| 5,161,907 A | 11/1992 | Byrne |
| 5,209,593 A | 5/1993 | Ros |
| 5,211,283 A | 5/1993 | Weisburn et al. |
| 5,215,188 A | 6/1993 | Wittman |
| 5,251,750 A | 10/1993 | Gelardi et al. |
| 5,297,672 A | 3/1994 | MacTavish |
| 5,305,873 A | 4/1994 | Joyce |
| D351,963 S | 11/1994 | Lim |
| 5,377,825 A | 1/1995 | Sykes et al. |
| 5,400,902 A | 3/1995 | Kaminski |
| 5,417,319 A | 5/1995 | Chalberg et al. |
| 5,443,159 A | 8/1995 | Cheng |
| 5,460,266 A | 10/1995 | Mundorf et al. |
| 5,499,714 A | 3/1996 | Konno |
| 5,509,528 A | 4/1996 | Weisburn |
| 5,515,968 A | 5/1996 | Taniyama |
| 5,526,926 A | 6/1996 | Deja |
| 5,549,203 A | 8/1996 | Weisburn et al. |
| 5,558,220 A | 9/1996 | Gartz |
| 5,586,651 A | 12/1996 | Krummenacher |
| 5,597,068 A | 1/1997 | Weisburn et al. |
| 5,598,728 A | 2/1997 | Lax |
| 5,605,227 A | 2/1997 | Morita |
| 5,609,250 A | 3/1997 | Moser |
| 5,636,737 A | 6/1997 | Marsilio |
| 5,662,218 A | 9/1997 | Ladwig |
| D385,145 S | 10/1997 | VerWeyst et al. |
| D386,013 S | 11/1997 | Tell |
| 5,682,991 A | 11/1997 | Lammerant et al. |
| 5,685,425 A | 11/1997 | Choi |
| 5,685,427 A | 11/1997 | Kuitems et al. |
| 5,690,224 A | 11/1997 | Koizumi |
| 5,718,332 A | 2/1998 | Tachibana |
| 5,762,187 A | 6/1998 | Belden, Jr. et al. |
| 5,769,218 A | 6/1998 | Yabe |
| 5,772,021 A | 6/1998 | Bolenbaugh et al. |
| 5,772,028 A | 6/1998 | Marsilio et al. |
| 5,775,500 A | 7/1998 | Williams |
| 5,779,039 A | 7/1998 | Ambrus |
| 5,782,350 A | 7/1998 | Weisburn et al. |
| 5,782,352 A | 7/1998 | Senda |
| 5,788,068 A | 8/1998 | Fraser et al. |
| 5,816,394 A * | 10/1998 | O'Brien et al. .......... 206/308.1 |
| 5,819,926 A * | 10/1998 | O'Brien et al. .......... 206/308.1 |
| 5,823,341 A | 10/1998 | Nakasuji |
| 5,829,582 A * | 11/1998 | Ippolito et al. .......... 206/308.1 |
| 5,829,583 A | 11/1998 | VerWeyst et al. |
| 5,850,752 A | 12/1998 | Lax |
| 5,878,878 A | 3/1999 | Wu |
| 5,899,327 A | 5/1999 | Sykes |
| 5,901,840 A | 5/1999 | Nakasuji |
| 5,904,246 A | 5/1999 | Weisburn et al. |
| 5,931,291 A | 8/1999 | Sedon et al. |
| 5,934,114 A | 8/1999 | Weisburn et al. |
| 5,944,173 A | 8/1999 | Boire et al. |
| 5,944,181 A * | 8/1999 | Lau .................... 206/308.1 |
| 5,944,185 A | 8/1999 | Burdett et al. |
| 5,975,298 A | 11/1999 | Sankey et al. |
| 5,988,375 A | 11/1999 | Chang |
| 5,988,376 A | 11/1999 | Lax |
| 5,996,788 A | 12/1999 | Belden, Jr. et al. |
| D422,428 S | 4/2000 | Pijanowski et al. |
| 6,065,594 A * | 5/2000 | Sankey et al. .......... 206/310 |
| 6,070,722 A | 6/2000 | Ng |
| 6,076,667 A | 6/2000 | Ambrus |
| 6,082,156 A | 7/2000 | Bin |
| 6,119,857 A | 9/2000 | Stumpff |
| 6,135,280 A | 10/2000 | Burdett et al. |
| 6,155,087 A | 12/2000 | Necchi |
| 6,155,417 A | 12/2000 | Flores, Jr. et al. |
| 6,164,446 A * | 12/2000 | Law .................... 206/308.1 |
| 6,170,656 B1 | 1/2001 | Cerda-Vilaplana et al. |
| 6,170,660 B1 | 1/2001 | Sankey et al. |
| 6,196,384 B1 | 3/2001 | Belden, Jr. |
| 6,206,185 B1 | 3/2001 | Ke et al. |
| 6,206,186 B1 | 3/2001 | Cerda-Vilaplana et al. |
| 6,227,362 B1 | 5/2001 | Cheung |
| 6,237,763 B1 | 5/2001 | Lau |
| 6,354,435 B1 * | 3/2002 | Belden, Jr. et al. .......... 206/310 |
| 6,394,266 B1 * | 5/2002 | Chon .................... 206/308.1 |
| 6,412,631 B2 * | 7/2002 | Belden, Jr. .............. 206/308.1 |
| 6,425,481 B1 | 7/2002 | Choi |
| 6,427,833 B1 * | 8/2002 | Hui .................... 206/310 |
| 6,547,068 B2 * | 4/2003 | Chu .................... 206/310 |
| 6,609,614 B1 * | 8/2003 | Huang .................. 206/308.1 |
| 2001/0032792 A1 | 10/2001 | Cheung |

\* cited by examiner

STORAGE HOLDER FOR A COMPACT DISC

BACKGROUND OF THE INVENTION

The present invention relates to a storage holder for a compact disc, and to a storage case containing such storage holder.

Compact discs are well known and are used as data recordal media for sound, drama and a wide variety of computer software.

Conventionally, such compact discs are stored in storage cases known as "jewel cases" which can accommodate one or more compact discs. The compact disc is secured within the storage case by a storage holder that restrains the compact disc thereby preventing damage or premature release from the storage case. The storage holder may be an integral part of the storage case or may be separable from the storage case.

BRIEF SUMMARY OF THE INVENTION

Known storage holders are exemplified in U.S. Pat. No. 5,526,926 and U.S. Pat. No. 5,788,068. The storage holder described in U.S. Pat. No. 5,526,926 comprises a central retaining element that passes through the clearance, i.e. hole, of a compact disc. The central retaining element contains spring catches that act as locking elements and which overlap the inner edge formed by the clearance. Additionally, the central retaining element contains substantially rectilinear lifting elements that are activated by an activation means that also releases the locking elements.

In U.S. Pat. No. 5,788,068 the storage holder comprises inwardly extending arms the inner ends of which form a disc-engaging member that is received by the hole of a compact disc. The compact disc is retained by lips that engage its outwardly facing surface. During release, the center of the compact disc is depressed, in other words flexed, by at least one of the lips.

The known storage holders as previously described address the problem of releasing the compact disc from the storage holder. However, in both instances the action of releasing the compact disc requires flexing of the compact disc, at least at its center. This flexing of the compact disc is undesirable and repeated flexing can lead to physical damage of the compact disc.

Additionally, known storage holders comprise various mechanism for positively releasing the compact disc from the storage holder. These mechanisms are often integral to the storage holder and/or storage case. As can be appreciated increasing the complexity of the storage holder and/or storage case also increases the difficulty of manufacture. Most such holders and cases are injection molded from some form of plastics material. Increasing the complexity therefore requires an increasingly complex mold, longer cycle times to ensure that the mold is correctly filled, increased reject rate and overall expense.

A first objective of the present invention is to provide a new storage holder that does not flex a compact disc during release of the compact disc from the storage holder.

A second objective is to provide a new storage holder as previously described having a relatively simple design thereby avoiding the necessity of using complex molds.

Accordingly the present invention provides a storage holder for a compact disc having a central hole, an upper surface and a lower surface, said storage holder comprising (a) a base portion;

(b) at least two inwardly extending radial arms connected to the base portion by a center disc supporting ring, each of said inwardly extending radial arms having a retaining rib for engaging the upper surface of the compact disc;

(c) a center button formed by the inner ends of the arms and which center button is receivable in the central hole of the compact disc;

and wherein release of the compact disc by depression of the center button and actuation of the retaining ribs and arms does not result in any flexing or lifting of the compact disc.

In a first preferred embodiment, during actuation of the retaining ribs, said retaining ribs move from engagement with the upper surface of the compact disc and remain at a distance from the upper surface of the compact disc.

In a second preferred embodiment, the retaining ribs each have a surface profile such that during actuation of said retaining ribs, said retaining ribs are not engageable with the upper surface of the compact disc.

In a third preferred embodiment, during actuation of the retaining ribs, said retaining ribs remain at a distance from the lower surface of the compact disc and are not engageable with the lower surface.

In a fourth preferred embodiment, during release of the compact disc the center disc supporting ring and radial extending arms co-operate so as to prevent flexing of the compact disc.

In a fifth preferred embodiment, during depression of the center button each radial arm moves resiliently about a pivot point and each retaining rib has a surface profile such that engagement of the retaining rib and the upper surface of the compact disc is avoided during said movement. Further, preferred is when each retaining arm moves through an angle of depression to the horizontal of from 10 to 15 degrees before the compact disc is releasable from the storage holder.

In use the storage holder is part of a storage case. The storage holder may be integral to the storage case or may be separable from the storage case. Preferably, because of different materials of construction used in the storage holder and storage case, the storage holder and storage case are separable.

BRIEF DESCRIPTION OF THE DRAWINGS

The invention is further described with reference to the following figures wherein:

In FIG. 1 the storage holder (11) is integral with the storage case (12). The storage holder (11) comprises a base portion (13) that is connected to five inwardly extending radial arms (14) by a center disc supporting ring (15). The dimension of the center disc supporting ring (15) is chosen such that when a compact disc (not shown) is retained within the storage holder (11) the portion of the lower surface of the compact disc that touches the center disc supporting ring (15) is free from data. Additional optional features that are shown include an outer disc supporting ring (16) that further supports the compact disc retained within the storage holder (11). As shown, the outer disc supporting ring (16) has on its periphery five release indents (17a,17b,17c,17d,17e), although the actual number provided is a matter for design discretion. The release indents (17a,17b,17c,17d,17e) enable the compact disc to be lifted from the storage holder (11). Another method for releasing the compact disc from the storage holder (11) is to invert the storage holder (11) and, when the center button (18) is depressed, the compact disc is released through the action of gravity.

In FIG. 2 the e five inwardly extending radial arms (14a, 14b, 14c, 14d, 14e) are shown connected to the center disc supporting ring (15). The inner ends of he arms (23a, 23b, 23e, 23d, 23e) form a center button (24). The inwardly extending radial arms also carry retaining ribs (25a, 25b, 25c, 25d, 25e).

In FIG. 3 the storage holder (11) is shown in cross-section with a compact disc (32) retained thereon. Two of the inwardly extending radial arms (33a, 33b) comprising the storage holder (11) are shown in cross-section and form partial center button (24). The retaining ribs (25a, 25b) carried by the arms (33a, 33b) are shown to have a profiled surface (36a, 36b). The retaining ribs (25a, 25b) are engaged against the upper surface (37) of a compact disc (32) and the lower surface (38) of the compact disc (32) sits on the center disc supporting ring (15) such that the center of the compact disc (32) is not flexed. Preferably, the center disk supporting ring (15) is so fabricated such that it is essentially non-resilient thereby assisting to prevent the flexing of the compact disc (32).

In FIG. 4 the center, button (24) is shown partially depressed by a downwards applied force during the release of a compact disc (32) from the storage holder (11). The inwardly extending radial arms (33a, 33b) are each pivoted about a pivot point (4a, 45b) respectively. Because of the resilient nature of the material of construction of the storage holder the arms (33a, 33b) return to their original position when the force depressing the center button (24) is removed. During the pivoting movement the retaining ribs (25a, 25b) carried by the arms (33a, 33b) also move. The profiled surface (36a, 36b) of each retaining rib (25a, 25b) is so contoured that during the pivoting movement contact with the upper surface (37) of the compact disc (32) is avoided thereby releasing the compact disc (32) without stressing or flexing it. Preferably, the compact disc (32) remains in position after release such that when the force depressing the center button (24) is removed and the arms (33a, 33b) return to their original positions then the retaining ribs (25a, 25b) can re-engage against the upper surface (37) of the compact disc (32) without stressing or flexing it.

In FIG. 5 the center button (24) is further depressed such that the inwardly extending radial arms (33a, 33b) are pivoted about a the pivot point (45a, 45b) respectively through an angle of depression of 10 degrees from the horizontal. As shown the compact disc (32) is still not releasable from the storage holder (11). However, the profiled surface (36a, 36b) of each retaining rib (25a, 25b) still does not contact the upper surface (37) of the compact disc (32).

In FIG. 6 the center button (24) is depressed to an extent that the compact disc (32) is releasable from the storage holder (11). As shown, the inwardly attending radial arms (33a, 33b) are pivoted about a the pivot point (45a, 45b) respectively through an angle of depression of 15 degrees from the horizontal.

Figure 1:
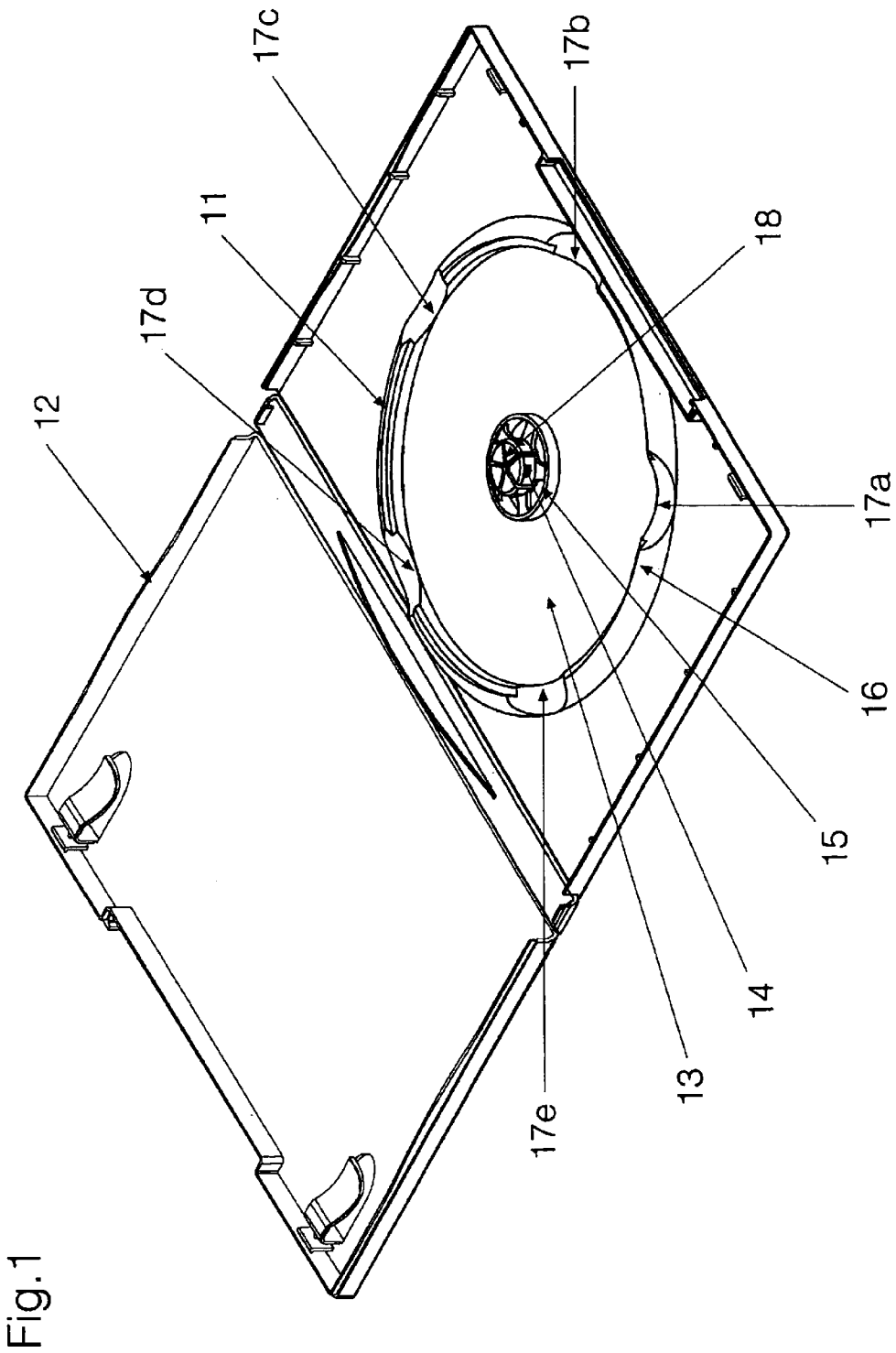
FIG. 1 shows a general arrangement of a storage holder that is integral with a storage case.
Figure 2:
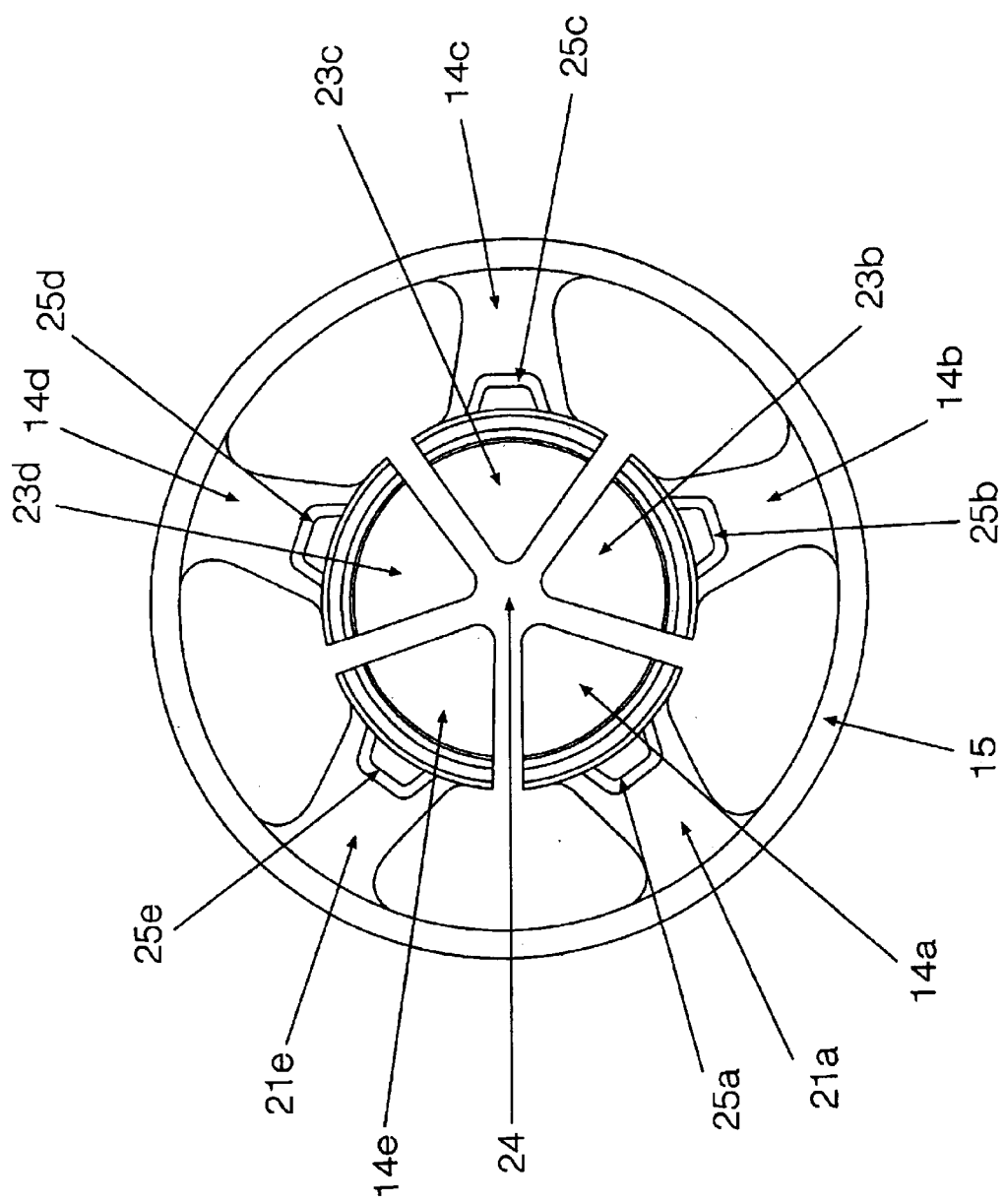
FIG. 2 shows a plan view of the inwardly extending radial arms that form a central button.
Figure 3:
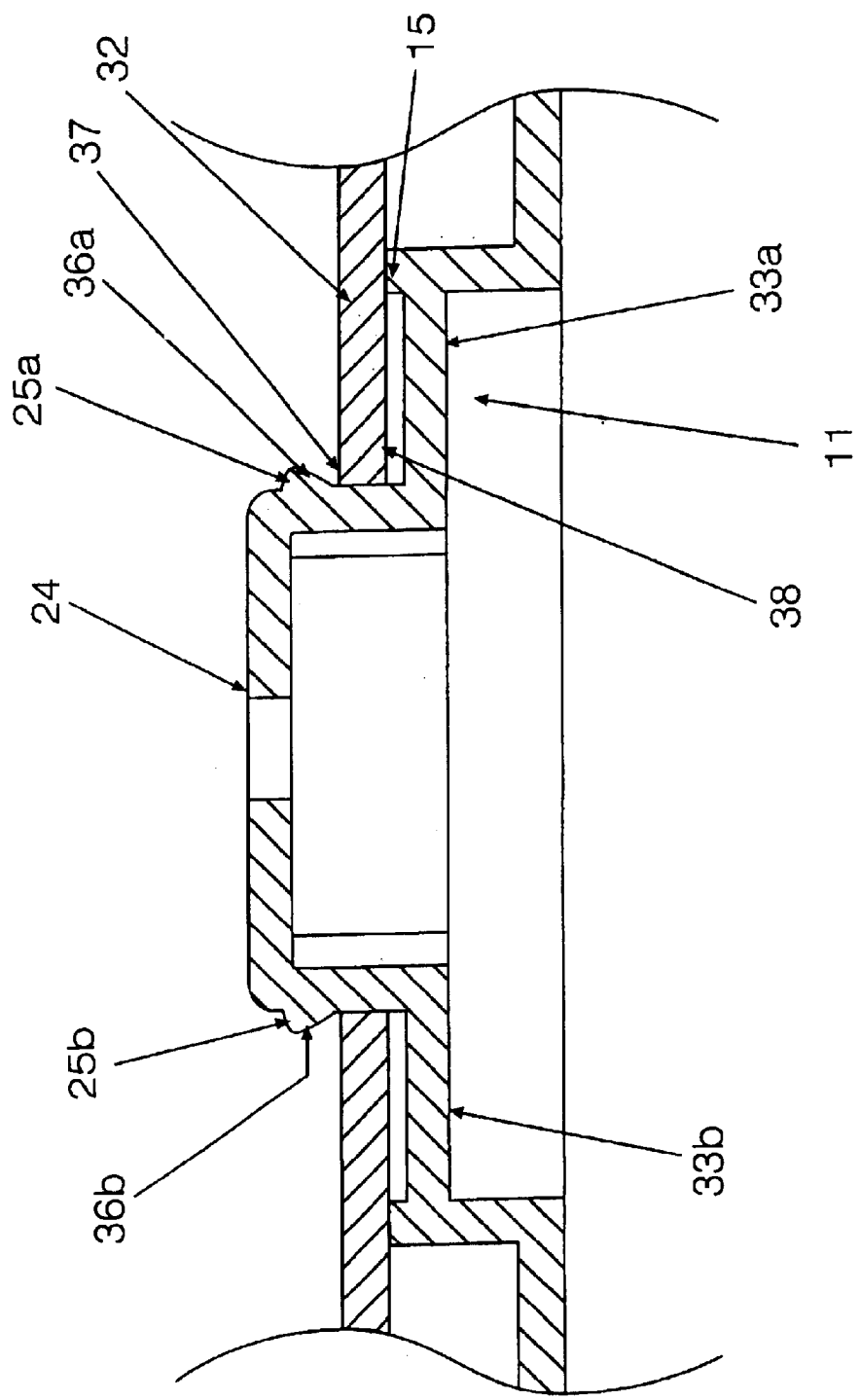
FIG. 3 shows a partial side view through a cross section of a storage holder with a compact disc retained in place.
Figure 4:
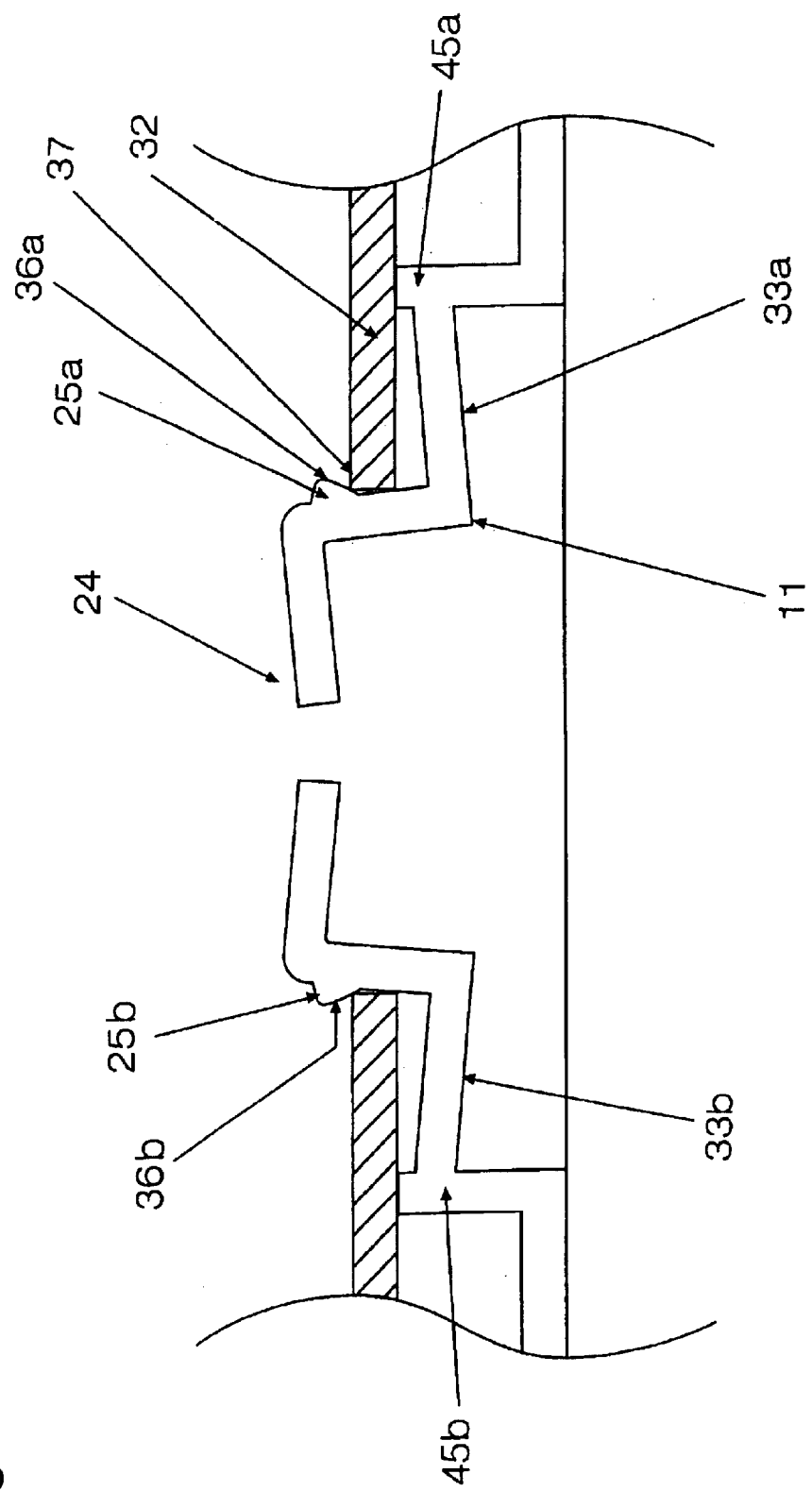
FIG. 4 shows a partial side view through a cross section of a storage holder with a compact disc retained place as the center button is depressed.
Figure 5:
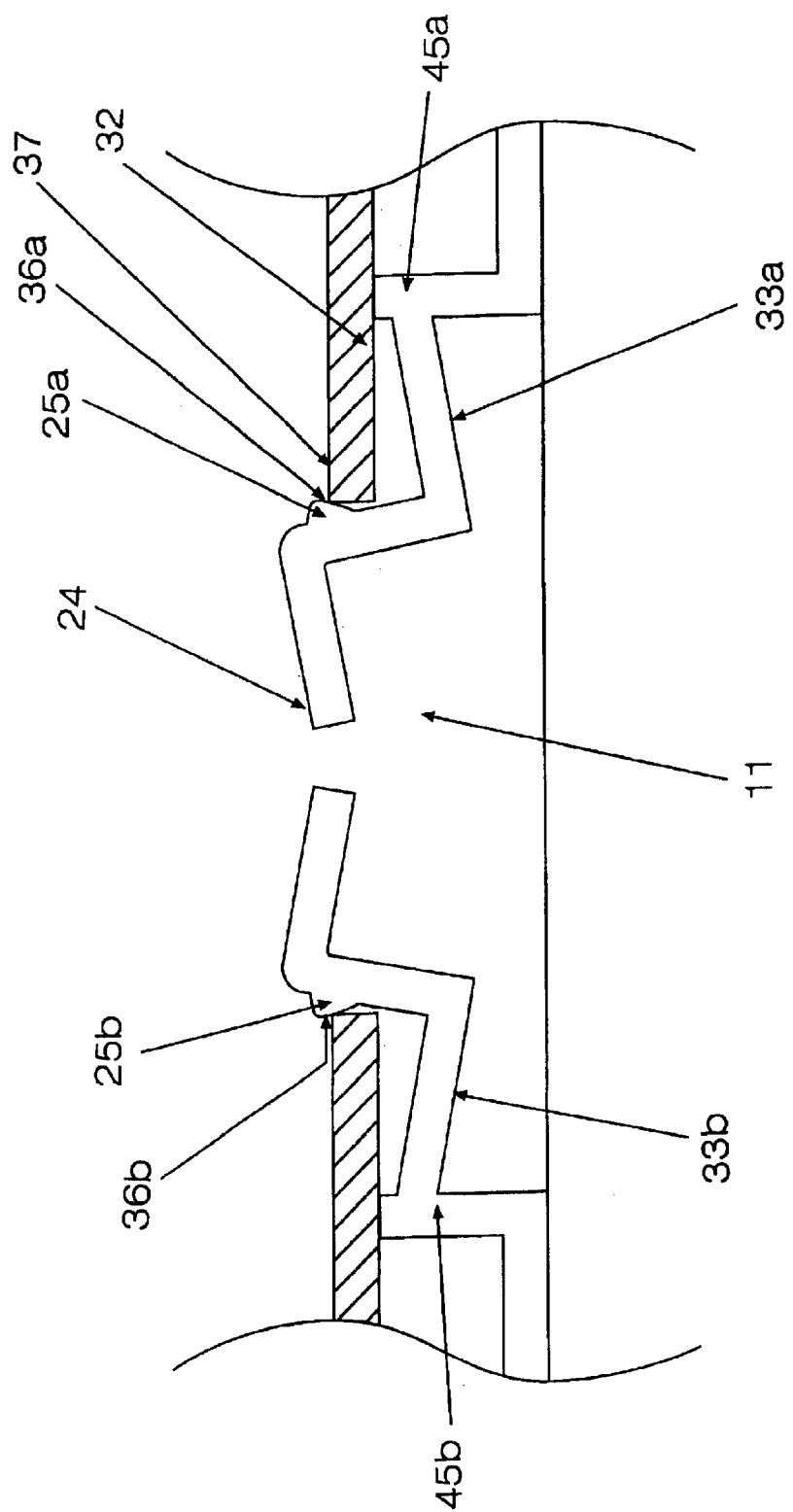
FIG. 5 is another view of the storage holder of FIG. 4 as the center button is further depressed.
Figure 6:
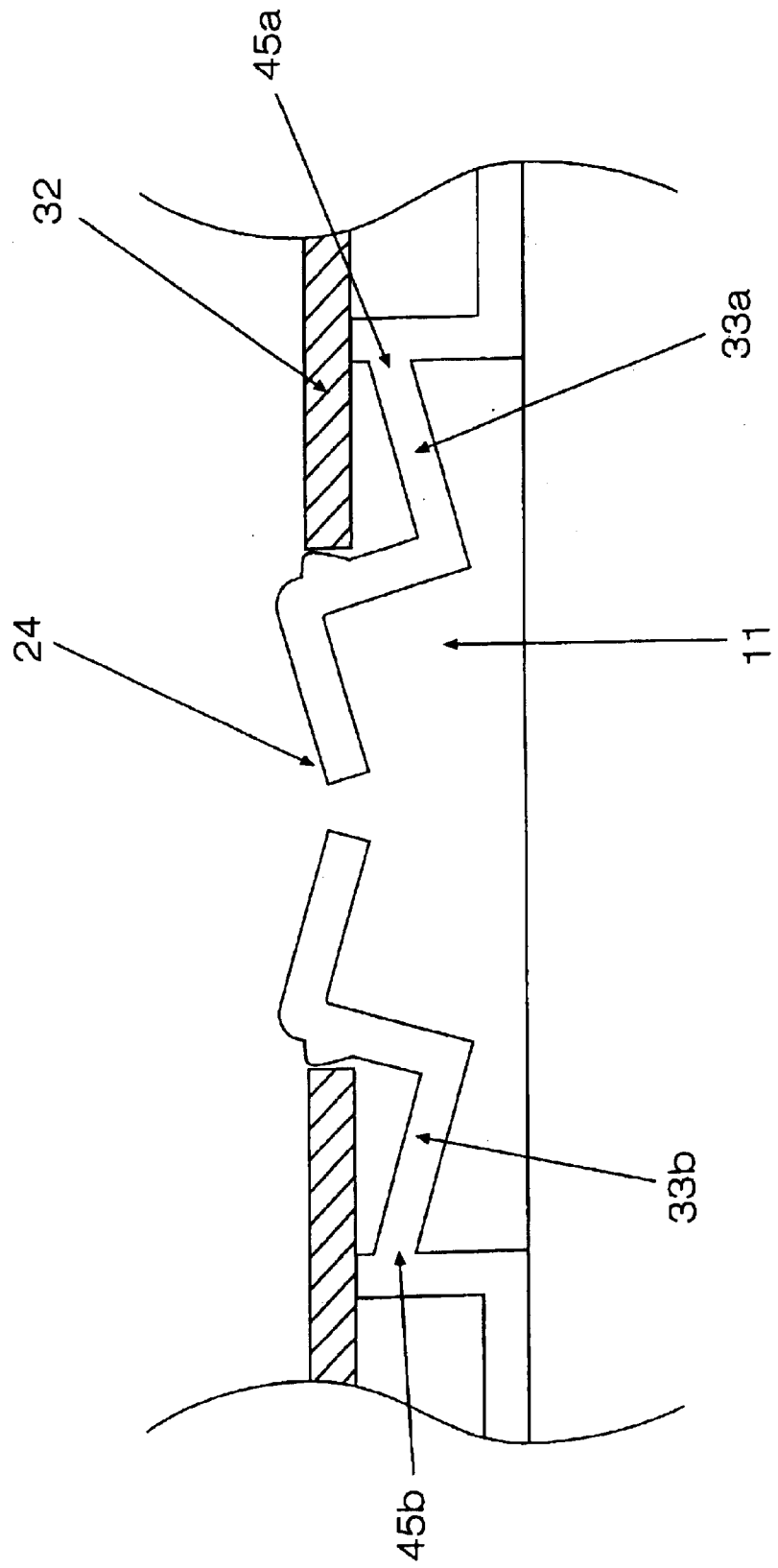
FIG. 6 is another view of the storage holder of FIG. 5 as the center button is further depressed to a position whether the compact disc is disengageable from the storage holder.

What is claimed is:

1. A storage holder for a compact disc having a central hole, an upper surface and a lower surface, said storage holder comprising;
   (a) a base portion;
   (b) at least two inwardly extending radial arms connected to the base portion by a center disc supporting ring, each of said inwardly extending radial arms having a retaining rib for engaging the upper surface of the compact disc;
   (c) a center button formed by the inner ends of the arms and which center button is receivable in the central hole of the compact disc;
   and wherein release of the compact disc by depression of the center button and actuation of the retaining ribs and arms does not result in any flexing or lifting of the compact disc.

2. A storage holder as claimed in claim 1 wherein during actuation of the retaining ribs, said retaining ribs move from engagement with the upper surface of the compact disc and remain at a distance from the upper surface of the compact disc.

3. A storage holder as claimed in claim 1 wherein the retaining ribs each have a surface profile such that during actuation of said retaining ribs, said retaining ribs are not engageable with the upper surface of the compact disc.

4. A storage holder as claimed in claim 1 wherein during actuation of the retaining ribs, said retaining ribs remain at a distance from the lower surface of the compact disc and are not engageable with the lower surface.

5. A storage holder as claimed in claim 1 wherein during release of the compact disc the center disc supporting ring and radial extending arms cooperate so as to prevent flexing of the compact disc.

6. A storage holder as claimed in claim 1 wherein during depression of the center button each radial arm moves resiliently about a pivot point and each retaining rib has a surface profile such that engagement of the retaining rib and the upper surface of the compact disc is avoided during said movement.

7. A storage holder as claimed in claim 6 wherein when each retaining arm moves through an angle of depression to the horizontal of from 10 to 15 degrees before the compact disc is releasable from the storage holder.

* * * * *